United States Patent [19]

Bossaert et al.

[11] Patent Number: 4,921,749
[45] Date of Patent: May 1, 1990

[54] SEALABLE FILMS

[75] Inventors: Bernard L. L. Bossaert; Stefan B. Ohlsson, both of Brussels; William F. M. J. Willems, Keerbergen, all of Belgium

[73] Assignee: Exxon Chemical Patents Inc., Linden, N.J.

[21] Appl. No.: 150,408

[22] PCT Filed: May 29, 1987

[86] PCT No.: PCT/GB87/00374
§ 371 Date: Mar. 17, 1988
§ 102(e) Date: Mar. 17, 1988

[87] PCT Pub. No.: WO87/07215
PCT Pub. Date: Dec. 3, 1987

[30] Foreign Application Priority Data

May 30, 1986 [GB] United Kingdom ............... 8613161

[51] Int. Cl.⁵ .................. B32B 27/08; B32B 27/32; B32B 31/30
[52] U.S. Cl. ................................ 428/216; 428/516; 428/349; 428/910; 428/518; 428/476.3
[58] Field of Search ............ 428/518, 216, 516, 910, 428/349

[56] References Cited

U.S. PATENT DOCUMENTS 4,230,767 10/1980 Isaka et al. ................... 428/349
4,590,125 5/1986 Balloni et al. ................ 428/349

FOREIGN PATENT DOCUMENTS 48-49835 7/1973 Japan.
52-151636 5/1977 Japan.
1563691 3/1980 United Kingdom.
2028168A 3/1980 United Kingdom.

Primary Examiner—P. C. Ives
Attorney, Agent, or Firm—J. F. Hunt; M. E. Wilson

[57] ABSTRACT

A film having superior seal strength and barrier properties comprises a base layer comprising 70 to 97 weight % of a polyolefin, e.g. polypropylene, and 3 to 30% weight of a resin of lower molecular weight than the polyolefin, e.g. a hydrogenated petroleum resin. On at least one of the surfaces of the base layer is a 1 to 20 weight % of a film of a random copolymer of 80 to 99 weight % of propylene and 1 to 20 weight % of ethylene, for example, an isotactic propylene-ethylene copolymer.

14 Claims, 4 Drawing Sheets

SEALABLE FILMS

This invention relates to films based on polypropylene including those which can be sealed by the application of heat.

Various polypropylene films have been described, e.g. in GB No. 2028168A, EP No. 135178 and DE No. 3247988 where the core or substrate of the film is polypropylene. Various additives are added for example certain modulus improvers, certain antistatic media, siloxanes and pigments.

However, none of these documents teach that films may be obtained having a seal strength which is significantly improved compared with previously known polyolefin films. We have devised films having a seal layer needing only one component which show improved seal strength properties over those previously known having only one component in the seal layer, i.e. either the seal strength is much improved at the same temperature of sealing or the same seal strength can be obtained at lower temperatures.

According to this invention a film, particularly a sealable film comprises a base layer comprising 70 to 97 wt. %, preferably 70 to 90 weight % of a polyolefin and 3 to 30, preferably 10 to 30 weight % of a resin of lower molecular weight than that of the polyolefin, said layer having on at least one surface thereo 1 to 20 weight % based on the weight of the base layer, of a film layer comprising a random copolymer of 80 to 99 weight % of propylene and 1 to 20 weight % of ethylene.

These films are capable of being used in the packaging industry and can meet the stringent criteria which are required for such films, such as sufficiently high modulus and excellent clarity. In addition, they have good barrier properties by which we mean low permeability to water vapour and gases, particularly oxygen. The films also have superior seal strength properties and are especially useful in heat seal packaging although they are useful in other packing outlets where cellophane is traditionally used, such as twist wrapping.

The base layer comprises a polyolefin and a low molecular weight resin. The polyolefin is preferably a polymer of a mono-alpha olefin containing from 2 to 8 carbon atoms and particularly 2 to 4 carbon atoms per molecule. Thus the polymer may be a homopolymer of one of the following olefins: ethylene, propylene, butene-1 and 4-methyl pentene-1, or hexene or a copolymer of two or more of these olefins. A particularly suitable material for the base layer of the film is polypropylene, especially a high molecular weight stereoregular predominantly crystalline polymer of propylene. Alternatively, a copolymer of propylene with up to 20 weight percent of another olefin, e.g. ethylene, could be used. An especially preferred polyolefin is an isotactic polypropylene with a density of from 0.86 to 0.92 g/cc measured at 23° C. according to ASTM D 1505 and a melt flow index of from 1 to 15 g/10 min as determined according to ASTM D1238 (conditions 230° C. and 2.16 kg). It maybe made by Ziegler polymerisation methods using for example $AlCl_3$ and $TiCl_4$ as catalyst.

The other component of the base layer is the low molecular weight resin, preferably a hydrogenated resin. This resin has a molecular weight below that of the polyolefin and is usually less than 5000, preferably less than 1000, for example, 500 to 1000. The resin can be a natural or synthetic resin and can have a softening point as measured by ASTM E 28 of from 60° to 180° C., e.g. from 80° to 150° C., most preferably from 100° to 140° C., especially 120° C. to 140° C.

Suitable resins which can subsequently be hydrogenated are hydrocarbon resins, ketone resins, polyamide resins, colophonium, coumarone resins, terpene resins, chlorinated aliphatic or aromatic hydrocarbon resins. Examples of hydrocarbon resins are polymers of coke oven gas, cracked naphtha, gas oil and terpene oil.

Particularly preferred hydrogenated resins are hydrogenated petroleum resins. These are usually prepared by catalytically hydrogenating a thermally polymerised steam cracked petroleum distillate fraction, especially a fraction having a boiling point of between 20° and 280° C. These fractions usually are of compounds having one or more unsaturated cyclic rings in the molecule, such as cyclo dienes, cycloalkenes and indenes. It is also possible to hydrogenate resins produced by the catalytic polymerisation of unsaturated hydrocarbons.

Before hydrogenation occurs the polymerised resin is usually dissolved in a saturated hydrocarbon solvent such as heptane. The hydrogenation catalysts used may be nickel, reduced nickel, or molybdenum sulphide. Hydrogenation can take place in a single stage at a temperature of 200° C. to 330° C., preferably from 210° C. to 230° C. at a pressure of 20 to 120 atmospheres, more preferably from 30 to 90 atmospheres for a period of 5 to 7 hours. After filtering off the catalyst, the solvent is removed by distillation and recovered for recycling. An improved hydrogenation process leading to increased yields of high quality hydrogenated hydrocarbon resins is described and claimed in European Patent No. 0082726 (Application No.82306853.1).

The ratio of polyolefin to the lower molecular weight resin in the base layer is 70 to 97, preferably 70 to 90 weight percent of polyolefin and 3 to 30, preferably 10 to 30 weight percent of lower molecular weight resin. More preferably the relative amounts are respectively 75 to 85 weight percent and 15 to 25 weight percent, for example about 80 weight percent and 20 weight percent.

The base layer or core of the film has, on one or preferably both surfaces 1 to 20 weight percent, preferably 1 to 10 weight percent and particularly about 5 weight percent based on the weight of the base layer, a film layer of a copolymer of 80 to 99 weight percent of propylene and 1 to 20 weight percent of ethylene, such copolymers being frequently referred to as random copolymers. This copolymer comprising the film layer(s) preferably comprises 90 to 99 weight percent, especially 94 to 98 weight percent, e.g. about 95.5 weight percent of propylene, the remainder being ethylene and is especially useful to provide heat-sealability.

This random copolymer of propylene and ethylene is usually an isotactic propylene-ethylene copolymer with a density of from 0.86 to 0.92 g/cc measured at 23° C. according to ASTM D 1505 and a melt flow index of from 2 to 15 g/10 min as determined according to ASTM D1238 (conditions 230° C. and 2.16 kg). It may be made by well-known polymerisation methods using a Ziegler catalyst, for example, $AlCl_3$ and $TiCl_4$.

The films of this invention, i.e. multilayer films are suitably formed by combining the components (which may if desired include other components such as an antistatic medium, blocking agents and slip aids) of the base layer and surface layer(s) in a conventional manner, preferably by a simultaneous co-extrusion technique.

Multiple-layer films according to the invention may be unorientated or uniaxially orientated, but are preferably biaxially orientated by drawing in two mutually perpendicular directions in the plane of the film to impart strength thereto. Orientation of flat film may be effected by a stenter technique, while orientated tubular film is suitably produced by coextruding the polymeric materials in the form of a multi-layer tube from an annular die, cooling the extruded tube (the cast tube), reheating and inflating the tube by the so-called "bubble" process to introduce transverse orientation, and simultaneously elongating the tube longitudinally to orientate the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

The films may vary in thickness depending on the intended application, but films of a thickness of from 2 to 150 microns are usually suitable. Films intended for packaging are usually from 10 to 60 microns thick. The thickness of each outer layer is usually from 0.05 to 2.5 microns.

EXAMPLE

In this Example coextruded films of different composition were made and compared as to their sealability, stiffness, optical properties and barrier properties.

These films were biaxially orientated by drawing in two materially perpendicular directions in the plane of the film to impart strength thereto. The stenter technique was used to impart an orientation ratio of 500% in machine direction and of 900% in transverse direction. Each of the biaxially orientated films had two seal layers of 1 micron thickness while the total thickness was about 22 microns.

The first film which was for comparison purposes consisted of a core of isotactic polypropylene having a density of about 0.90 g/cc measured at 23° C. according to ASTM D 1505 and a melt flow index of 2.8 g/10 min as determined according to ASTM D1238 (conditions 230° C. and 2.16 kg). On both faces of the core there was a surface film of a random copolymer of about 95.5 weight percent propylene and 4.5 weight percent of ethylene. This was an isotactic copolymer with a density of 0.90 g/cc measured at 23° C. according to ASTM D 1505 and a melt flow index of 6.5 g/10 min as determined according to ADTM D1238 (conditions 230° C. and 2.16 kg).

The second film was the same as the first film except that the core was a blend of 80% by weight of the isotactic polypropylene used as the core of the first film and 20% by weight of a hydrogenated petroleum resin. This resin was prepared by catalytically hydrogenating a thermally polymerised steam cracked petroleum distillate fraction having a boiling point between 20° and 280° C. The hydrogenation process was carried out as described in European Patent No. 0082726 (Application No. No. 82306853.1). The resulting resin was characterised by a Ring and Ball softening point of 125° C.

The accompanying FIGS. 1 to 7 show the results obtained for the seal strength, hot tack, haze, gloss, stiffness and barrier properties for films 1 (comparative) and 2 (according to the invention)

These tests were carried out as follows:

Seal strength

This is the "cold" heat seal strength of the film which is measured after the seal has cooled to ambient temperature and the full potential strength of the seal has developed.

A Packforsk Hot Tack Tester (model 52-B) from Design & Test Consult AB (Bromma-Sweden) has been used to make the heat seals. A strip of 15 mm wide and some 280 mm long is thereto folded over upon itself and sealed together between the heated jaws of this instrument.

The formed seal has an area of some 15×5 mm. Dwell conditions on the seal have been kept constant at a pressure of 5 bar and a dwell time of 0.5 seconds. To measure the seal strength, the instrument is used in a mode whereby upon opening of the sealing jaws the automatic peeling action used for hot tack measurements is not activated. The seal is instead cooled to ambient temperature. The unsealed ends of the strip are then attached to the jaws of a tensile testing machine. The force required to break the seal at a rate of 508 mm/min is recorded by the tensile tester and expressed as the seal strength in kg/15 mm.

Hot tack

This is the strength of the heat seal measured just after the seal has been made and before the thermal energy employed to form the heat seal has dissipated. The hot tack has been determined using the same Packforsk instrument. The heat seal is made as described above but just after the opening of the sealing jaws a peeling action is now automatically started and the force to break the seal is automatically recorded and expressed as the hot tack in kg/15 mm. The peeling operation takes places at a controlled delay time (=time between opening of the jaws and start of the peeling operation) and controlled peel rate. Following constant conditions have been used for all hot tack determinations: delay time=0.9 seconds, peel rate=100 mm/s.

Haze and gloss

These optical properties of the film have been determined with a Gardner Hazemeter, haze according to ASTM D1003 and gloss according to ASTM D523.

E-modulus

The modulus of elasticity which is a measurement of film stiffness has been determined from the tensile test of 15 mm wide film samples according to DIN 53457.

Barrier Properties

Humidity and oxygen barrier properties were determined by measuring the water vapour transmission rate (WVTR) and the oxygen transmission rate (OTR). WVTR has been measured according to ASTM F 372 at 37.4° C. and 100% relative humidity using a Permetran W5 instrument from Modern Controls Incorporated. OTR was measured according to ASTM D 3985 at 27° C. using an Oxtran Twin instrument also from Modern Controls Incorporated.

From FIG. 1 it can be seen that the seal strength (kg/15 mm) for film 2 is much higher at temperatures of between 100° and 110° C. and above 130° C. than for film 1. Between 110° and 130° C. the seal strength is comparable or higher than for film 1.

From FIG. 2 it can be seen that the hot tack (kg/15 mm) for film 2 is much better than for film 1 for temperatures up to about 110° C.

From FIG. 3 and FIG. 4 it can be seen that there is less haze and more gloss for film 2 than with film 1.

From FIG. 5 it can be seen that the stiffness of film 2, as measured by the E-modulus, is significantly higher than the stiffness of film 1.

From FIG. 6 and FIG. 7 it can be seen that the barrier properties of film 2 are about twice as good as those of film 1.

It is quite surprising that with the presence of the relatively small amount (20 weight %) of hydrogenated resin in the base layer one achieves such better results compared with the prior art film.

We claim:

1. A film comprising a base layer which comprises 70 to 97 weight % of a polyolefin and 3 to 30 weight % of a hydrogenated resin having a molecular weight lower than that of the polyolefin, said layer having on at least one surface thereof 1 to 20 weight % based on the weight of the base layer, of a one component film layer of a copolymer of 80 to 99 weight % of propylene and 1 to 20 weight % of ethylene.

2. A film according to claim 1 in which the base layer comprises 70 to 90 weight % of the polyolefin and 10 to 30 wt. % of the resin.

3. A film according to claim 1 or claim 2 in which the copolymer is a random copolymer.

4. A film according to claim 1 wherein the polyolefin in the base layer is a polymer of a mono alpha olefin containing 2 to 4 carbon atoms per molecule.

5. A film according to claim 4 wherein the polypropylene is an isotactic polypropylene with a density of from 0.86 to 0.92 g/cc measured at 23° C. according to ASTM D 1505 and a melt flow index of from 1 to 15 g/10 min as determined according to ASTM D1238 (conditions 230° C. and 2.16 kg).

6. A film according to claim 5 wherein the hydrogenated resin in the base layer is a hydrogenated petroleum resin.

7. A film according to claim 6 wherein the hydrogenated resin has been prepared by hydrogenating using a hydrogenation catalyst at a temperature of 200° to 330° C., a thermally polymerised steam cracked distillate fraction or a catalytically polymerised unsaturated hydrocarbon fraction.

8. A film according to claim 7 in which the hydrogenated resin has a softening point as measured by ASTM E28 of 100° to 140° C.

9. A film according to claim 1 wherein the base layer comprises 75 to 85 weight % of polyolefin and 15 to 25 weight % of resin.

10. A film according to claim 9 wherein the base layer has on each surface 1 to 10 weight percent based on the weight of the base layer of said film layer comprising said random copolymer.

11. A film according to claim 10 wherein the random copolymer comprises 94 to 98 weight percent of propylene and 2 to 6 weight percent of ethylene.

12. A film according to claim 11 wherein the random copolymer is an isotactic propylene-ethylene copolymer with a density of from 0.86 to 0.92 g/cc measured at 23° C. according to ASTM D 1505 and a melt flow index of from 2 to 15 g/10 min as determined according to ASTM D1238 (conditions 230° C. and 2.16 kg).

13. A film according to claim 12 which is biaxially orientated.

14. A film according to claim 13 which is 10 to 60 microns thick and wherein the thickness of each outer film layer is 0.05 to 2.5 microns.

* * * * *

(12) REEXAMINATION CERTIFICATE (4278th)

United States Patent
Bossaert et al.

(10) Number: US 4,921,749 C1
(45) Certificate Issued: Feb. 27, 2001

(54) SEALABLE FILMS

(75) Inventors: Bernard L. L. Bossaert; Stefan B. Ohlsson, both of Brussels; William F. M. J. Willems, Keerbergen, all of (BE)

(73) Assignee: Exxon Chemical Patents, Inc., Linden, NJ (US)

Reexamination Requests:
No. 90/004,821, Oct. 31, 1997
No. 90/005,363, May 18, 1999

Reexamination Certificate for:
Patent No.: 4,921,749
Issued: May 1, 1990
Appl. No.: 07/150,408
Filed: Mar. 17, 1988

(22) PCT Filed: May 29, 1987
(86) PCT No.: PCT/GB87/00374
§ 371 Date: Mar. 17, 1988
§ 102(e) Date: Mar. 17, 1988
(87) PCT Pub. No.: WO87/07215
PCT Pub. Date: Dec. 3, 1987

(30) Foreign Application Priority Data

May 30, 1986 (GB) .................................................. 8613161

(51) Int. Cl.⁷ ........................... B32B 27/08; B32B 27/32; B32B 31/30
(52) U.S. Cl. ....................... 428/216; 428/349; 428/476.3; 428/516; 428/518; 428/910
(58) Field of Search ................................... 428/515, 516, 428/213, 216, 518, 476.3, 910

(56) References Cited

U.S. PATENT DOCUMENTS

| | | | |
|---|---|---|---|
| 4,230,767 | 10/1980 | Isaka et al. | 428/349 |
| 4,328,090 | 5/1982 | Stuckey, Jr. et al. | 208/44 |
| 4,384,024 | 5/1983 | Mitchell et al. | 428/349 |
| 4,552,930 | 11/1985 | Hirota et al. | 525/333.8 |
| 4,629,766 | 12/1986 | Malatesta et al. | 525/222 |
| 4,786,533 | 11/1988 | Crass et al. | 428/13 |
| 5,128,183 | * 7/1992 | Buzio | 428/35.7 |

FOREIGN PATENT DOCUMENTS

| | | |
|---|---|---|
| 812213 | 5/1969 | (CA) . |
| 2 028 168 | 3/1980 | (GB) . |
| 2055688 | 3/1981 | (GB) . |
| 2028168 | 3/1990 | (GB) . |
| 60-210647 | 10/1985 | (JP) . |

OTHER PUBLICATIONS

Hydrocarbon Resins, Hercules Inc. Information Bulletin pp 10–17, (undated).*
Encyclopedia of Polymer Science and Engineering, vol. 13, pp. 464–529, 1985.
Prillieux, "Current Developments In Olefin Upgrading/Upgrading Of Steam Cracker Gasoline Fractions to ESCOREZ 8000–5000 (Hydrocarbon Resins)," Pet. Tech. No. 268 42–45 (Jan.–Feb. 1980) (Abstract).
JP 58–213037 (Abstract), 1984.
JP A 59 66532 (D–2 Translation) "Polypropylene Film".
Prillieux, "Le Development Actuel Dans La Valorisation des Olegines/Valorisation des Coupes D'Essence de Vapocraquage (Escorez 8000–5000)," Pet. Tech. N.268 42–45 (Jan.–Feb. 1980).–abstract only.
English Abstract of JP 60–210647 A2 (Oct. 23, 1985).
English translation of JP–60–210647 A2 (Oct. 23, 1985).
R. Chang "Chemistry 3rd. Edition" pp 19–22, 1988.*
"Propylene Polymers", The Encyclopedia of Polymer Science and Engineering (vol. 13), pp 464–529, 1985.*

* cited by examiner

Primary Examiner—Vivian Chen

(57) ABSTRACT

A film having superior seal strength and barrier properties comprises a base layer comprising 70 to 97 weight % of a polyolefin, e.g. polypropylene, and 3 to 30% weight of a resin of lower molecular weight than the polyolefin, e.g. a hydrogenated petroleum resin. On at least one of the surfaces of the base layer is a 1 to 20 weight % of a film of a random copolymer of 80 to 99 weight % of propylene and 1 to 20 weight % of ethylene, for example, an isotactic propylene-ethylene copolymer.

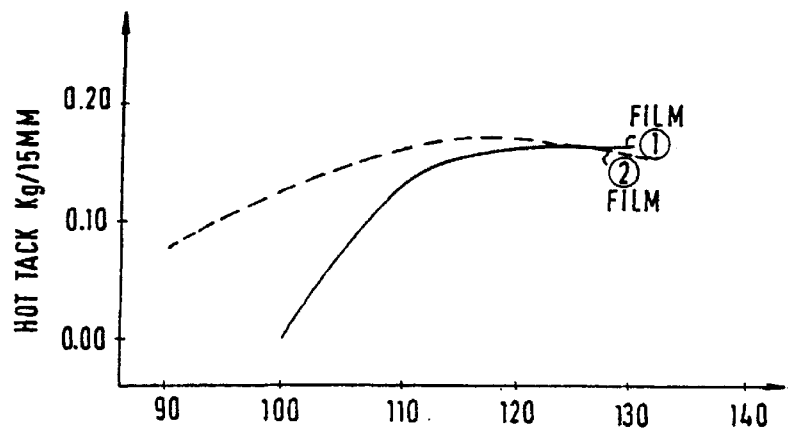

US 4,921,749 C1

REEXAMINATION CERTIFICATE ISSUED UNDER 35 U.S.C. 307

Figure 1:
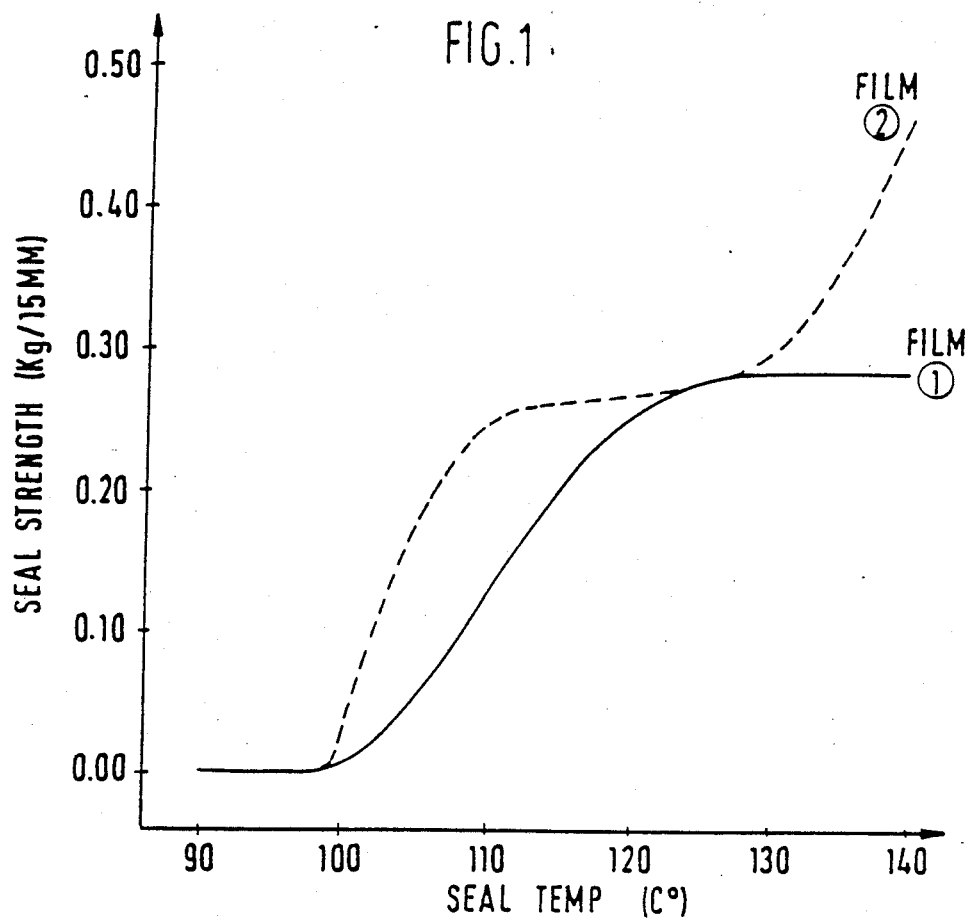
Figure 2:
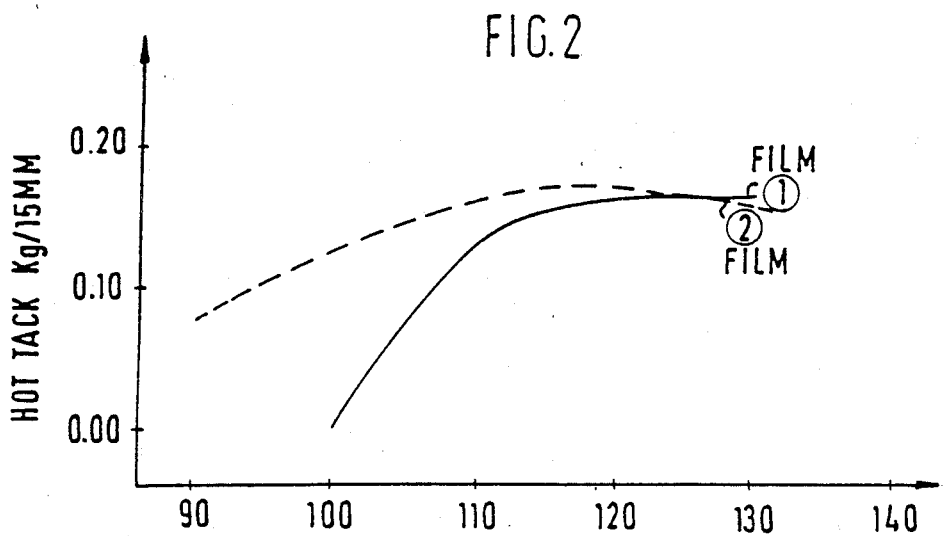
Figure 3:
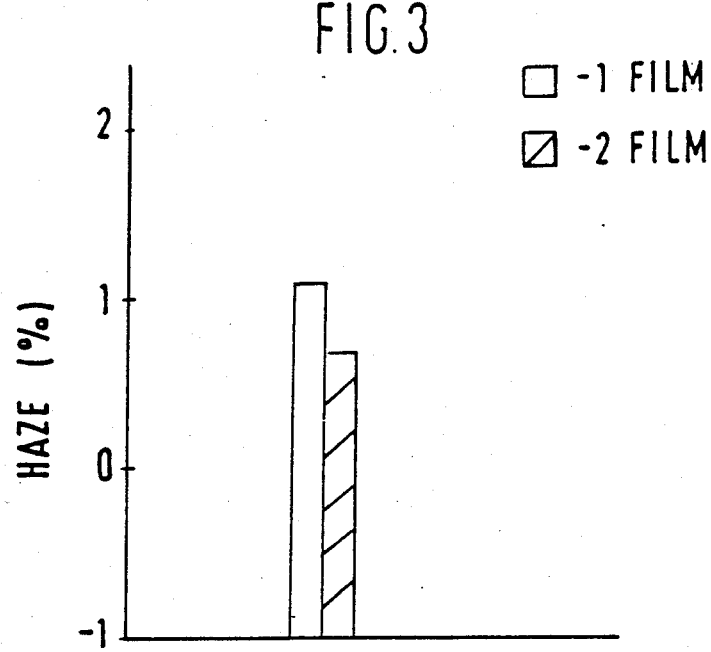
Figure 4:
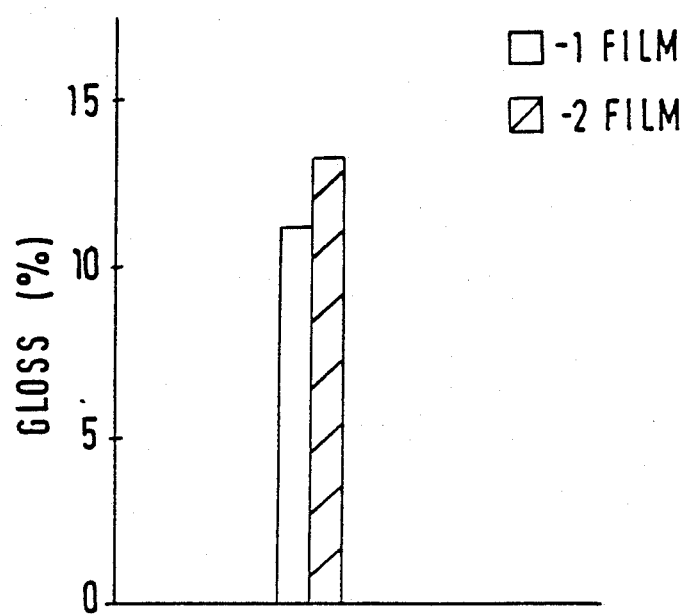
Figure 5:
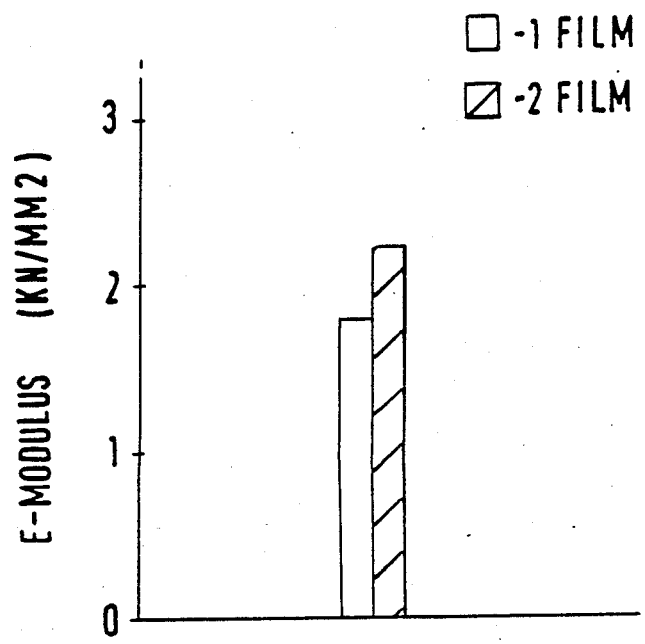
Figure 6:
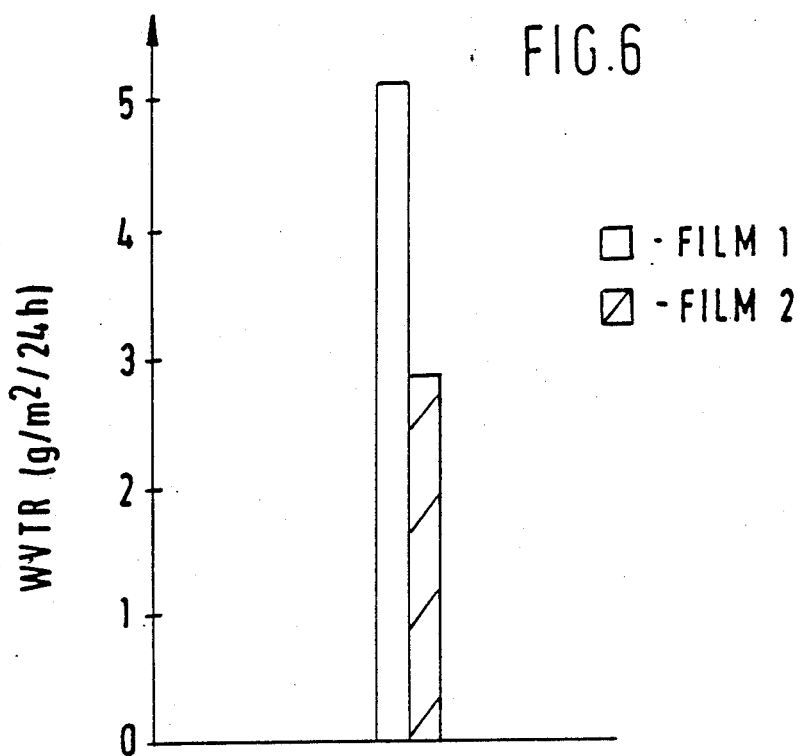
Figure 7:
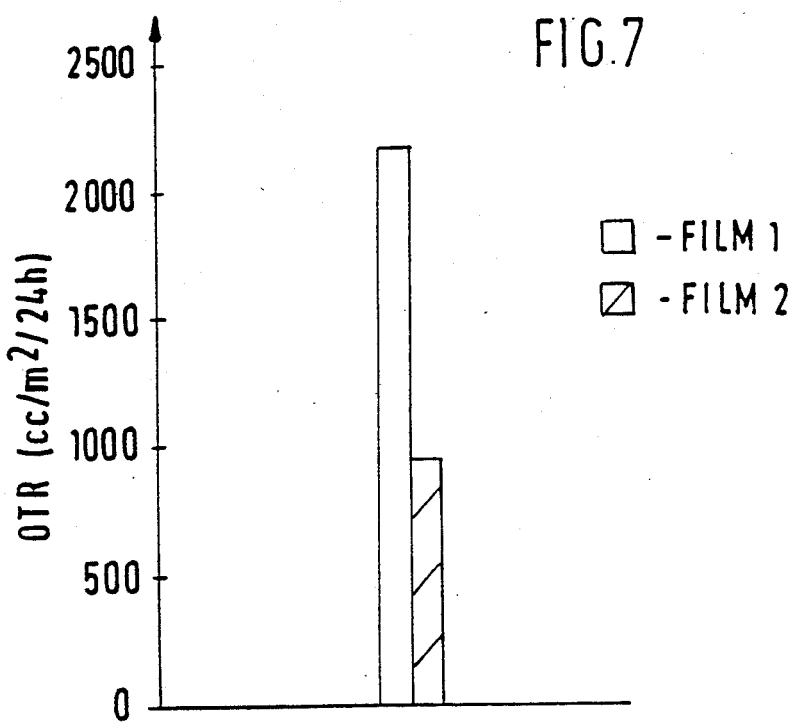

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 10 and 11 are determined to be patentable as amended.

Claims 2–4, 6–9 and 12–14, dependent on an amended claim, are determined to be patentable.

New claims 15–33 are added and determined to be patentable.

1. A film comprising a base layer which comprises 70 to 97 weight % of a polyolefin and 3 to 30 weight % of a hydrogenated resin having a molecular weight lower than that of the polyolefin, said layer having on at least one surface thereof 1 to 20 weight % based on the weight of the base layer, of a one component film layer of a copolymer of 80 to [99] 95.5 weight % of propylene and [1 to 20] 4.5 to less than 20 weight % of ethylene.

5. A film according to claim 4 wherein the [polypropylene] *polyolefin* is an isotactic polypropylene with a density of from 0.86 to 0.92 g/cc measured at 23° C. according to ASTM D1505 and a melt flow index of from 1 to 15 g/10 min as determined according to ASTM D1238 (conditions 230° C. and 2.16 kg).

10. A film according to claim 9 wherein the base layer has on each surface 1 to 10 weight percent based on the weight of the base layer of said film layer comprising said [random] copolymer *wherein said copolymer is a random copolymer*.

11. A film according to claim 10 wherein the random copolymer comprises 94 to [98] *95.5* weight percent of propylene and [2 to 6 weight percent of] *the remainder being* ethylene.

*15. A film according to claim 1, in which the hydrogenated resin is a hydrogenated petroleum resin.*

*16. A film according to claim 1, in which the hydrogenated resin has been prepared by hydrogenating using a hydrogenation catalyst at a temperature of 200° to 330° C., a thermally polymerised steam cracked distillate fraction or a catalytically polymerised unsaturated hydrocarbon fraction.*

*17. A film according to claim 1, in which the hydrogenated resin has a softening point as measured by ASTM E28 of 60° to 180° C.*

*18. A film according to claim 17, in which the softening point as measured by ASTM E28 is from 80° to 150° C.*

*19. A film according to claim 18, in which the softening point as measured by ASTM E28 is from 100° to 140° C.*

*20. A film according to claim 18, in which the softening point as measured by ASTM E28 is from 120° to 140° C.*

*21. A film according to claim 1, in which the hydrogenated resin is selected from the group consisting of hydrogenated hydrocarbon resins, ketone resins, polyamide resins, colophonium, coumarone resins, terpene resins, chlorinated aliphatic hydrocarbon resins, and chlorinated aromatic hydrocarbon resins.*

*22. A film according to claim 21, in which the hydrocarbon resin is selected from the group consisting of polymers of coke oven gas, cracked naptha, gas oil and terpene oil.*

*23. A film comprising a base layer which comprises 80% by weight of isotactic polypropylene and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron.*

*24. A film according to claim 23, in which the random copolymer is an isotactic copolymer having a density of 0.90 g/cc measured at 23° C. according to ASTM D 1505 and a melt flow index of 6.5 g/10 min. determined by ASTM D1238 at conditions of 230° C. and 2.16 kg.*

*25. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has a seal strength higher than the seal strength of a second film at temperatures of 100–110° C. and above 130° C., the second film comprising a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min, the second film having a total thickness of about 22 microns and the surface film on each face having a thickness of about 1 micron.*

*26. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has a seal strength equal to or greater than the seal strength of a second film at temperatures of 110–130° C., the second film comprising a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.*

*27. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has a hot tack which is higher than the hot tack at temperatures up to about 110° C. of a second film which comprises a base layer which is isotactic polypropylene having a density of about 0.90 g/cc* and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

28. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has less percent haze than a second film which comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

29. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has greater percent gloss than a second film which comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

30. A film comprising a base layer which comprises 80% by weight of isotactic polypropylene having a density of about 0.90 g/cc and a melt flow index of 2.8 g/10 min. and 20% by weight of hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has greater stiffness than a second film which comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

31. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has a lower water vapor transmission rate than a second film which comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

32. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % polypropylene and 4.5 wt. % ethylene, the film having a total thickness of about 22 microns and the surface film on each face having a thickness of about 1 micron, wherein the film has a lower oxygen transmission rate than a second film which comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the copolymer having a density of 0.90 g/cc and a melt flow index of 6.5 g/10 min., the second film having a total thickness of about 22 microns and the surface film on each face having a thickness of about 1 micron.

33. A film comprising a base layer which comprises 80% by weight of isotactic polypropylene having a density of about 0.90 g/cc and a melt flow index of 2.8 g/10 min. and 20% by weight of a hydrogenated petroleum resin, the base layer having on both faces a surface film of a random copolymer of about 95.5 wt. % propropylene and 4.5 wt. % ethylene, the film having a total thickness of about 22 microns and the surface film on each face having a thickness of about 1 micron, wherein the film has: (i) a seal strength higher than the seal strength of a second film at temperatures of 100–110° C. and above 130° C.; (ii) a seal strength equal to or greater than the seal strength of the second film at temperatures of 110–130° C.; (iii) a hot tack which is higher than the hot tack of the second film at temperatures up to about 110° C.; (iv) less percent haze than the second film; (v) greater percent gloss than the second film; (vi) greater stiffness than the second film; (vii) a lower water vapor transmission rate than the second film; and (viii) a lower oxygen transmission rate than the second film, and the second film comprises a base layer which is isotactic polypropylene having a density of about 0.90 g/cc and a melt flow index of 2.8 g/10 min., and a surface film on both faces of the base layer wherein the surface film is a random isotactic copolymer of about 95.5 wt. % polypropylene and 4.5 wt. % ethylene, the compolymer having a density of 0.90 g/cc and a melt flow index of 6.5 g/10 min., the second film having a total thickness of about 22 microns and the surface film on each face having a thickness of about 1 micron.

\* \* \* \* \*